(12) United States Patent
Rajalingam et al.

(10) Patent No.: US 10,958,556 B2
(45) Date of Patent: Mar. 23, 2021

(54) PROBE AND SECURE THE VULNERABLE NETWORK SERVICES USING A CENTRALIZED CONTROLLER

(71) Applicant: COLORTOKENS, INC., Santa Clara, CA (US)

(72) Inventors: Hari Hara Sudhan Rajalingam, Hosur (IN); Kantesh Sakri, Bangalore (IN); Ravi Voleti, Fremont, CA (US); Vikas Kumar, Bengaluru (IN)

(73) Assignee: COLORTOKENS, INC., Santa Clara, CA (US)

( * ) Notice: Subject to any disclaimer, the term of this patent is extended or adjusted under 35 U.S.C. 154(b) by 0 days.

(21) Appl. No.: 16/252,695

(22) Filed: Jan. 20, 2019

(65) Prior Publication Data
US 2020/0236027 A1 Jul. 23, 2020

(51) Int. Cl.
*H04L 12/26* (2006.01)
*H04L 12/24* (2006.01)

(52) U.S. Cl.
CPC .......... *H04L 43/10* (2013.01); *H04L 41/0631* (2013.01); *H04L 41/18* (2013.01)

(58) Field of Classification Search
CPC ........ G06F 11/00; G06F 13/00; G06F 21/577; H04L 12/24; H04L 12/26; H04L 12/2602; H04L 29/06; H04L 29/08072; H04L 29/08099; H04L 41/18; H04L 41/22; H04L 41/0631; H04L 43/00; H04L 43/10; H04L 63/14; H04L 63/20; H04L 63/126; H04L 63/145; H04L 63/0823; H04L 63/1408; H04L 63/1416; H04L 63/1425; H04L 63/1433; H04L 63/1441; H04L 67/00
USPC .............................................. 709/224; 726/25
See application file for complete search history.

(56) References Cited

U.S. PATENT DOCUMENTS

2014/0344937 A1\* 11/2014 Sabin .................. H04L 63/1433
726/25

\* cited by examiner

*Primary Examiner* — Robert B Harrell
(74) *Attorney, Agent, or Firm* — Barry Choobin; Patent 360LLC (57) ABSTRACT

A centralized controller for probing and securing vulnerable network resources is disclosed. A list of services hosted by a resource is received at the controller. A request to probe the list of services hosted on the resource is received by the controller. A probe candidate is determined by the controller. The probing is triggered by the controller based on a user scheduled time. The probing includes sending a probe packet that contains a special marker. The controller sends the list of resources to be probed for a set of port and protocol, to the probe candidate. A probe result generated as a result of the probing is received at the controller. The probe result includes vulnerable service information. A policy is computed based on the probe result and is enforced on the probed resources.

14 Claims, 7 Drawing Sheets

Probes configuration
Probing results 10/10/18 09:33am

| DEST. IP ADDRESS | DEST. HOSTNAME | SOURCE IP ADDRESS | SOURCE HOSTNAME | REACHABLE PORT FOR DESTINATION IP |
|---|---|---|---|---|
| 10.30.65.188/23 | QA-01016 | 10.30.88.239/23 | QA-UbuntuServer16-x64 | TCP:22 UDP:68 ICMP |
| 10.30.88.238/23 | QA-UbuntuServer16-x64-Sanity | 10.30.65.188/23 | QA-01016 | TCP:22 UDP:68 ICMP |
| 10.30.88.239/23 | QA-UbuntuServer16-x64-Sanity | 10.30.65.188/23 | QA-01016 | TCP:22 ~~UDP:68~~ |
| 10.30.88.240/23 | QA-UbuntuServer16-x64-Sanity | 10.30.65.188/23 | QA-01016 | TCP:22 UDP:68 ICMP |
| 10.30.88.241/23 | QA-UbuntuServer16-x64-Sanity | 10.30.65.188/23 | QA-01016 | TCP:22 ~~UDP:68~~ |
| 10.30.88.242/23 | QA-UbuntuServer16-x64-Sanity | 10.30.65.188/23 | QA-01016 | TCP:22 UDP:68 ICMP |
| 10.30.88.243/23 | QA-UbuntuServer16-x64-Sanity | 10.30.65.188/23 | QA-01016 | TCP:22 UDP:68 ICMP |

FIG. 4A

| SUMMARY | TAGS | | SECURITY |
|---|---|---|---|
| VULNERABILITY SCORE FETCHED AS OF 10 OCT 2018 (11:32 AM) (FETCH NOW) | | | |
| PROBE RESULT AS OF 10 OCT 2018 (11:32 AM) | | | (PROBE NOW) |
| OPEN PORTS | VULNERABILITY | | EXPOSURE(PROBE) |
| TCP-22 | CVE-2018-1000504 | | 10.30.65.188/23 |
| | CVE-2018-1000167 | | 10.30.88.150/23 |
| | CVE-2018-1000118 | | 10.30.85.150/23 |
| | CVE-2018-14923 | | 10.30.65.188/23 |
| | CVE-2018-1000006 | | 10.30.88.150/23 |
| UDP-68 | CVE-2018-15350 | | 10.30.85.150/23 |

FIG. 6

PROBE AND SECURE THE VULNERABLE NETWORK SERVICES USING A CENTRALIZED CONTROLLER

BACKGROUND

Vulnerability management programs make up the front line of risk reduction for security conscious organizations. A vulnerability assessment is the process of defining, identifying, classifying and prioritizing vulnerabilities in computer systems, applications and network infrastructures, and providing the enterprise performing the assessment with required awareness, knowledge and risk to understand the threats to its environment and act or react accordingly. Enterprises employ vulnerability testing on a periodic basis to ensure the security of their networks, particularly when changes are made, e.g., services are added, new equipment is installed or ports are opened. Vulnerability assessment aims to uncover vulnerabilities in a network and recommend the appropriate mitigation or remediation to reduce or remove the risks.

As the enterprise environment gets more complicated, so does vulnerability management. Many organizations piece together disparate, stand-alone solutions to accomplish the key aspects of vulnerability management such as assessment, mitigation, and protection. However, this leaves them with a disjointed picture of security, which is not only more difficult to manage, but also more expensive. With security budgets and resources under pressure, it is required to take the most efficient approach possible that brings the key pieces of vulnerability management together in a single solution. Unified vulnerability Management delivers a consolidated solution for assessing, mitigating, and protecting the environment, while reducing the overall cost of security and compliance. It is challenging to identify a vulnerability assessment that delivers unified configuration and vulnerability scanning across network devices, operating systems, applications, databases, and web applications using a scalable, non-intrusive approach.

BRIEF DESCRIPTION OF THE DRAWINGS

The claims describe the embodiments with particularity. The embodiments are illustrated by way of examples and not by way of limitation in the figures of the accompanying drawings, in which like references indicate similar elements. Various embodiments, together with their advantages, may be best understood from the following detailed description taken in conjunction with the accompanying drawings.

DETAILED DESCRIPTION

Embodiments of techniques for probing and securing the vulnerable network resources, using a centralized controller are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Continuous monitoring is the process of constantly and persistently monitoring technological assets, vulnerabilities, configurations, and primarily current network events to discover new resources or assets that may be vulnerable, and detecting anomalies or other suspicious activities. Continuous network monitoring requires the integration of core technologies with applied intelligence that when combined gives an enterprise the ability to implement and maintain an effective and efficient continuous monitoring and assessment program. By orchestrating internal processes with the technical information explained in the below embodiments, organizations can create the baseline operational and technical capabilities to support real-time resource discovery, real-time situational awareness of vulnerabilities and events and real-time incident response in resources.

Vulnerability and configuration assessment or scanning involves scanning a baseline of resources for vulnerabilities and configuration information. The configuration and vulnerability assessment includes, capturing network events in real time, logging the result of assessment, storing, correlating, and analyzing current network events and any resources logs against vulnerability and configuration assessment results. Vulnerability and configuration assessment also necessitates a centralized management console to visualize, analyze, and review the vulnerability assessment of the resources. This console will help develop correlation and other anomaly-based rules, manage remediation workflow and incident response, and generate alerts on the discovery of new vulnerabilities.

Figure 1:
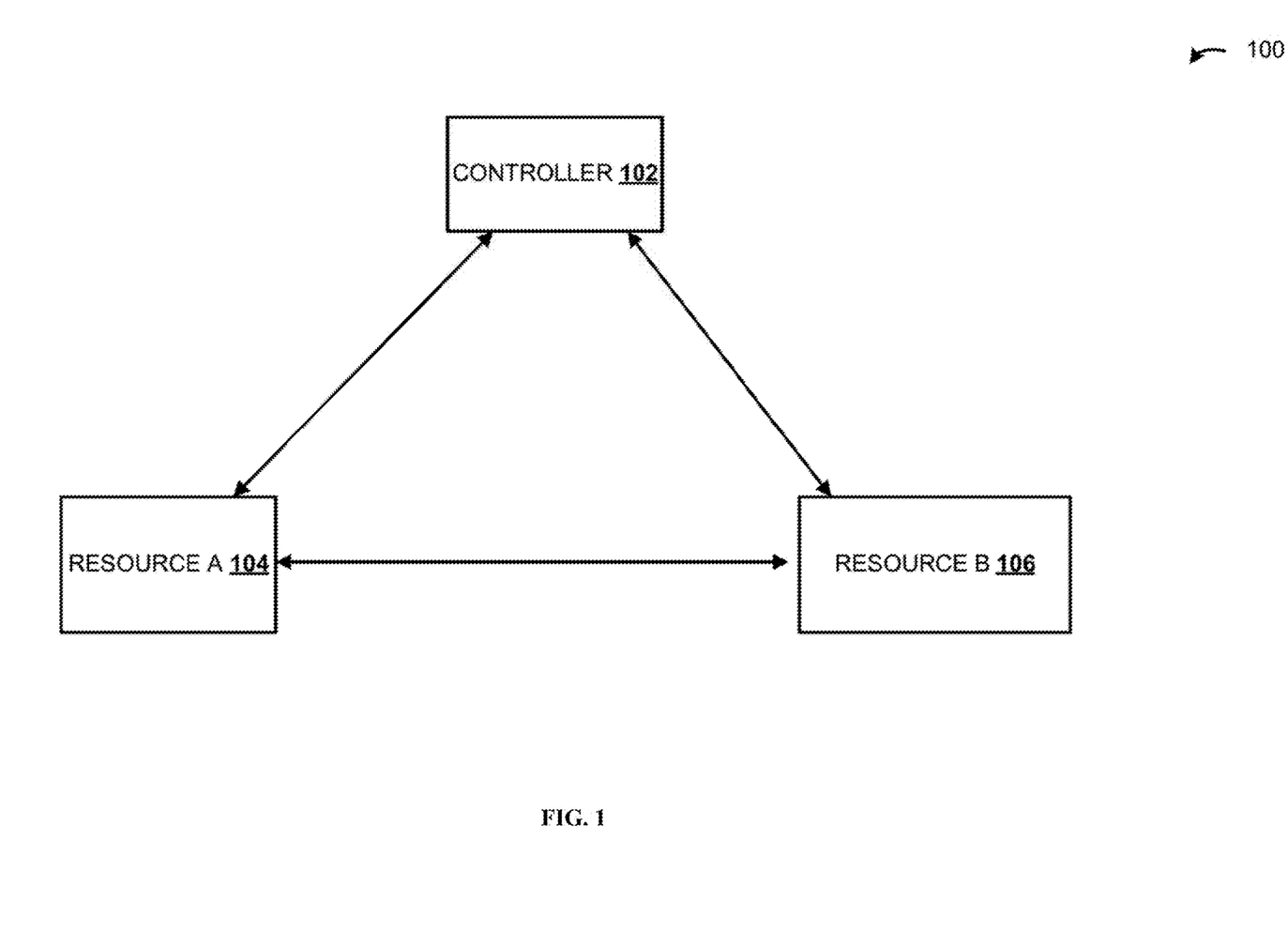
FIG. 1 is a block diagram illustrating high level architecture of a system for probing and securing the vulnerable network resources, using a centralized controller, according to one embodiment.

FIG. 1 is a block diagram illustrating high level architecture of a system 100 for probing and securing the vulnerable network resources, using a centralized controller, according to one embodiment. Computer networks in an enterprise share common devices, functions, and features including servers, clients, transmission media, shared data, shared printers and other hardware and software resources, network interface card (NIC), local operating system (LOS), and the network operating system (NOS). Various resources or assets in the enterprise network include servers, clients, transmission media, printers and peripheral devices, switches, routers, customer relationship management (CRM), enterprise resource planning (ERP), supply chain management (SCM), product lifecycle management (PLM), backup software, master data management (MDM), etc. Enterprise applications entail the display, manipulation, and storage of large amounts of often complex data and the support or automation of business processes with that data. Data servers or enterprise servers host proprietary enterprise applications such as customer relationship management (CRM), enterprise resource planning (ERP), supply chain management (SCM), etc.

Typically, an enterprise resource reports list of services hosted by them. For example, the resource CRM application lists the set of services such as web service, IO service, etc. A controller 102 gets the consolidated list of all services on network. The controller 102 requests a certain resource to probe services on other resources. For example, in an exemplary network, resource A 104 and resource B 106 are available. The resource A 104 and the resource B 106 execute various services. Resource A 104 probes services running on the other resource such as the resource B 106. Probing the resources is performed by using probe packets including or containing special markers. The special markers are configured to identify that they are used as probe packets. For example, the special markers are used to identify probe packets as shown in the below table, where the ColorTokens™ signature value is used as a proprietary marker:

| IP | TCP | TCP option type = ColorToken's signature value (reserved TCP option) to indicate probe |
| IP | UDP | App payload (ColorToken's signature) |
| IP | ICMP | App payload (ColorToken's signature) |

The probe packets are marked with proprietary information. After the probe is completed, the vulnerable service information is sent back to the controller 102. The controller 102 uses the probe result to compute policy and enforce them on resources. The probe results are displayed in a user interface associated with a vulnerability assessment application executed on the controller 102.

Figure 2:
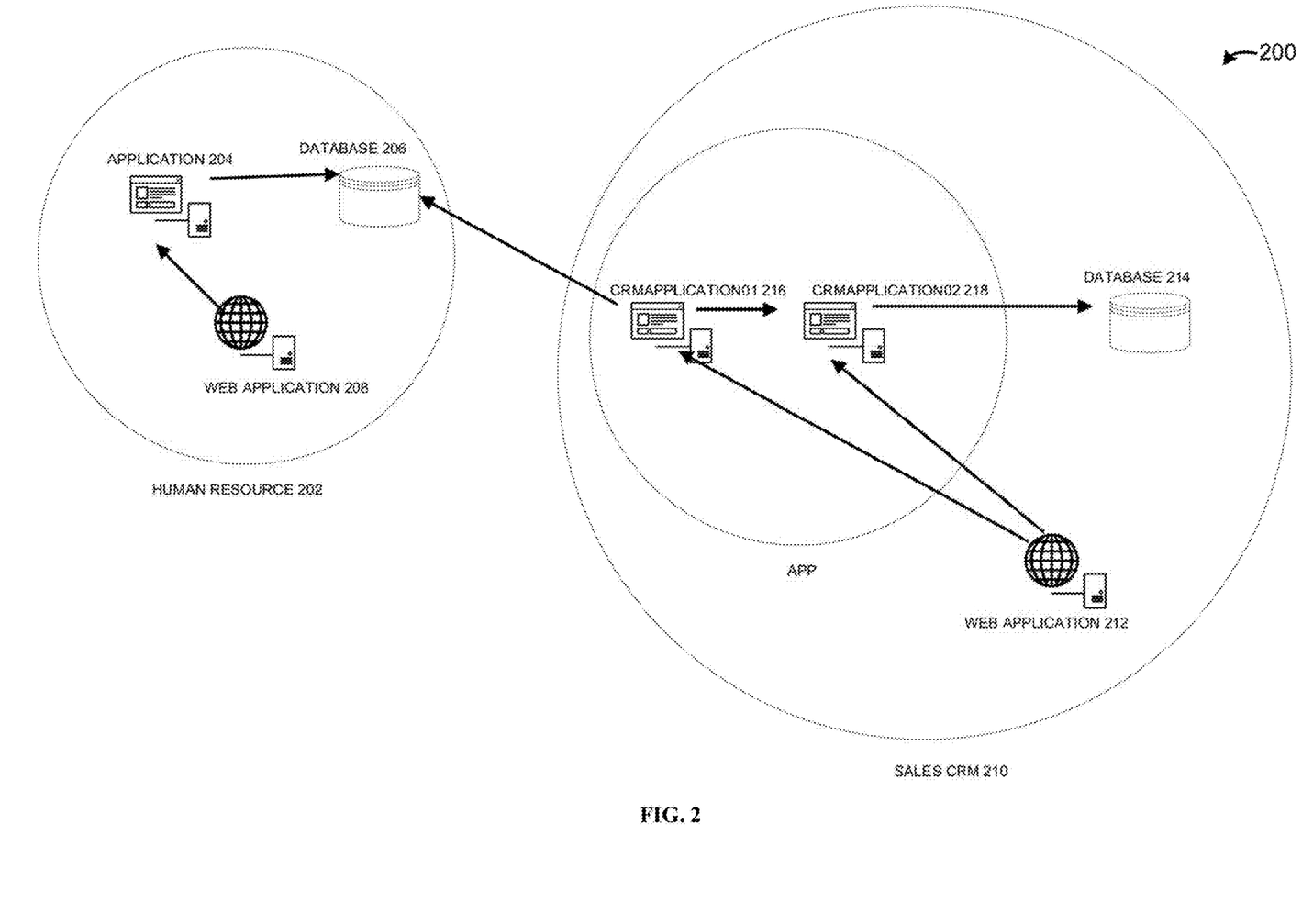
FIG. 2 is a block diagram illustrating high level architecture of a computerized environment for probing and securing the vulnerable network resources, using the centralized controller, according to one embodiment.

FIG. 2 is a block diagram illustrating high level architecture of a computerized environment 200 for probing and securing the vulnerable network resources, using a centralized controller 102, according to one embodiment. The environment diagram of the network architecture provides a complete picture of the established network with detailed view of all the resources accessible. It includes hardware components used for communication, cabling and device types, network layout and topologies, physical and wireless connections. A Customer Relationship management (CRM) system is a platform for storing customer data and interactions, generated across multiple channels, creating efficiencies across business and encourages team collaboration. Using cloud technology, the CRM system is updated in real-time and accessed through the browser. An enterprise application such as human resource 202 includes resources such as application 204, database 206 and web application 208. The other enterprise application sales CRM 210 includes resources such as web application 212, database 214, and CRM application01 216 and CRM application02 218. The human resource 202 includes devices or servers which contain critical and sensitive information that needs to be protected from unauthorized access.

The human resource 202 and the sales CRM 210 are hosted in the enterprise application servers that contain specialized programs to execute the sales CRM 210 and human resource 202 applications. The enterprise servers hosting such enterprise applications typically reside within the enterprise. Users may use devices such as desktop, laptop, portable computer, tablet, etc to connect to the said enterprise servers. These user devices are used to access the enterprise application such as human resource 202 and sales CRM 210. The resources in the human resource 202 and the sales CRM 210 is probed and assessed for vulnerable security issues. The controller 102, also referred to as a central controller, is responsible for various functions such as vulnerability assessment and policy generation and enforcement. An agent is a light-weight software agent that is deployed on the individual resources to be protected. These agents are hardened, non-disruptive, and do not come in the traffic path.

Figure 3:
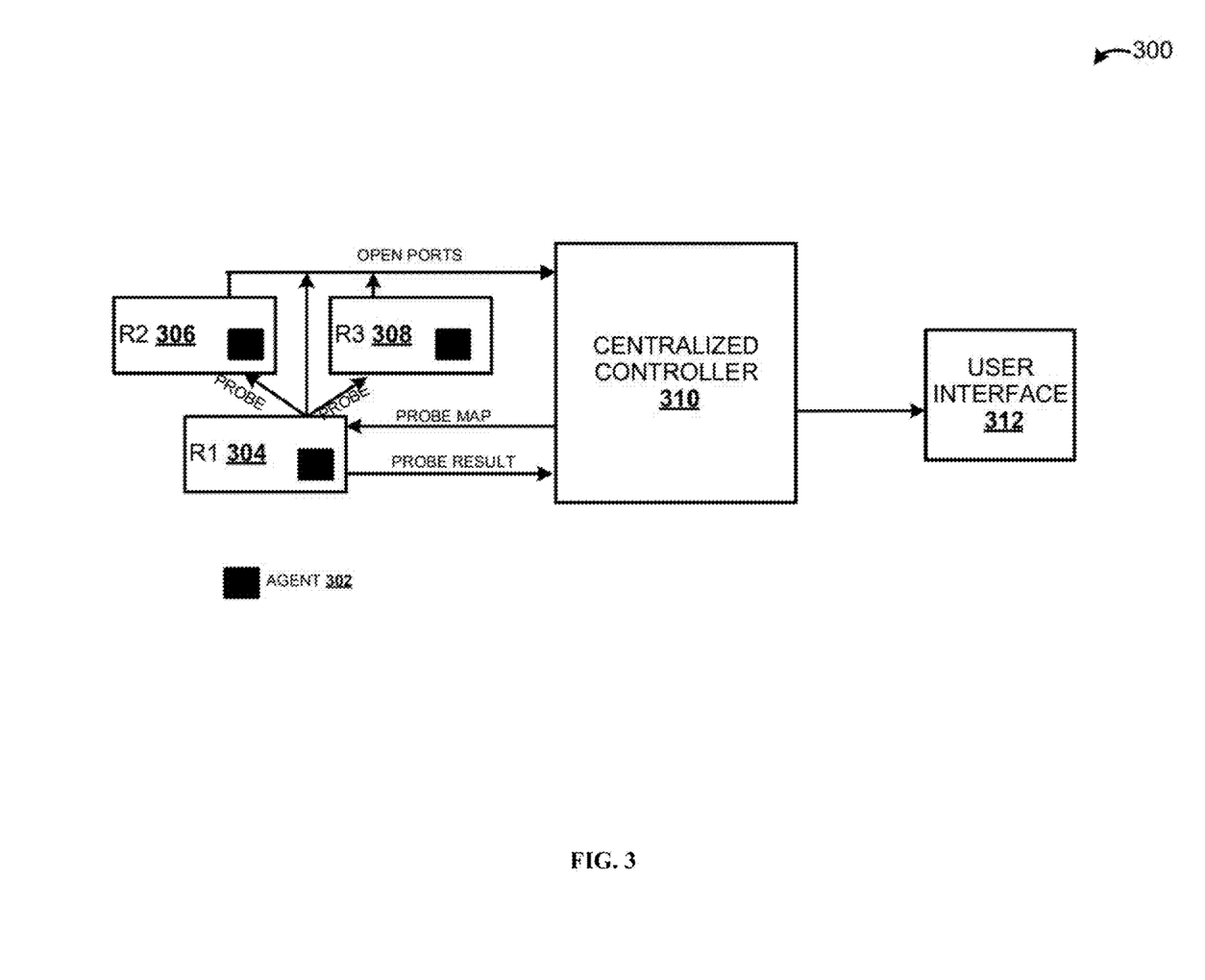
FIG. 3 illustrates a use case pictorially describing the high level architecture of a system for probing and securing the vulnerable network resources, using a centralized controller, according to one embodiment.

FIG. 3 illustrates a use case for illustrating the high level architecture of a system 300 for probing and securing the vulnerable network resources, using a centralized controller 310, according to one embodiment. Agent 302 is a light-weight software agent that is deployed on the individual resources such as R1 304, R2 306 and R3 308. The agent 302 is installed in the individual resources also referred to as endpoints. The agent 302 installed in R1 304, sends open port details (protocol and port) of the resource R1 304 to the centralized controller/controller 310. The controller 310 triggers the probe based on the user scheduled time. The controller provides a scheduler using which the user can schedule daily or weekly or monthly probes. User can also run on demand probe. The controller 310 generates a probe map, identifies a probe candidate and a list of resources to be probed. The controller 310 creates segments, where the list of resources to be probed against a set of ports and protocols is given to the probe candidate. Probe candidate is an end point that's identified to do the probing. Controller 310 sends the list of resources to be probed along with the open port details to the probe candidate. Probe candidate upon receipt of the request sends probe packet to those resources. For example, in the above case, the probe candidate identified may be resource R1 304, and the resource R1 304 may send the probe packets with special markers to the other resources R2 306 and R3 308 in parallel. Probe candidate sends packets to all those resources marking them as ColorTokens™ (CT) signature packets on the corresponding open ports using TCP, UDP or ICMP. It also checks whether the port that's discovered as open is reachable by the probe candidate using ICMP. Probe candidate collects the probe results from all the packets and sends it to the controller 310. For example, the probe result is collected from the resources R2 306 and R3 308 and sent to the controller 310 by the probe candidate resource R1 304.

Resources could also initiate probing in parallel. Resource sends a probe request packet (probe packet) to all the destined resources and waits for a pre-configured time interval before any response is received. There are timeouts in the agent and the controller side. If the probe request is not complete or fails, based on the timeout, an error would be reported to the user. After the probe results are received by the controller 310, the probe results are displayed in a user interface 312 associated with the vulnerability assessment application. Vulnerability is based on the reachable ports, protocols and processes including the common vulnerability scoring system (CVSS) value. CVSS is based on open industry standard for assessing the severity of the vulnerabilities. CVSS attempts to assign severity scores to vulnerabilities, and the scores are calculated based on metrics ranging from 0 to 10. When new services are added, there might be new ports coming up and this is reported to the controller 310. The next time the probe is run, reachability against the new port is also reported. Probe is scheduler based or on demand as needed by the user.

Probes results (ports reachability) complimented with vulnerability scan reports (such as Nessus®, Nexpose®, Qualys®) will help policy recommendation by way of suggesting an appropriate security policy. Policy for a resource looks like below. Based on the probe result, any port being reachable and vulnerable will be presented to the user for an appropriate action.

```
defined_diff_acl " : [
    {
        "name" : "add_firewall_rule",
        "payload" : {
            "src_ip" : [
                "106.0.0.0/8",
                "7.0.0.0/8",
                "49.0.0.0/8",
                "64.0.0.0/8",
                "52.0.0.0/8",
                "10.0.0.0/8",
                "54.0.0.0/8",
                "34.0.0.0/8"
            ],
            "action" : "allow",
            "direction" : "in",
            "src_port" : "any",
            "dst_port" : "53",
            "protocol" : "17",
            "interface" : "all-underlay",
            "dst_ip" : [
                "any"
            ]
            "colorzone" : ""
        }
    },
    {
        "name" : "add_firewall_rule",
        "payload" : {
            "src_ip" : [
                "106.0.0.0/8",
                "7.0.0.0/8",
                "49.0.0.0/8",
                "64.0.0.0/8",
                "52.0.0.0/8",
                "10.0.0.0/8",
                "54.0.0.0/8",
                "34.0.0.0/8"
            ],
            "action" : "allow",
            "direction" : "in",
            "src_port" : "any",
            "dst_port" : "6000",
            "protocol" : "6",
            "interface" : "all-underlay",
            "dst_ip" : [
                "any"
            ]
            "colorzone" : ""
        }
    }
]
```

Figure 4A:
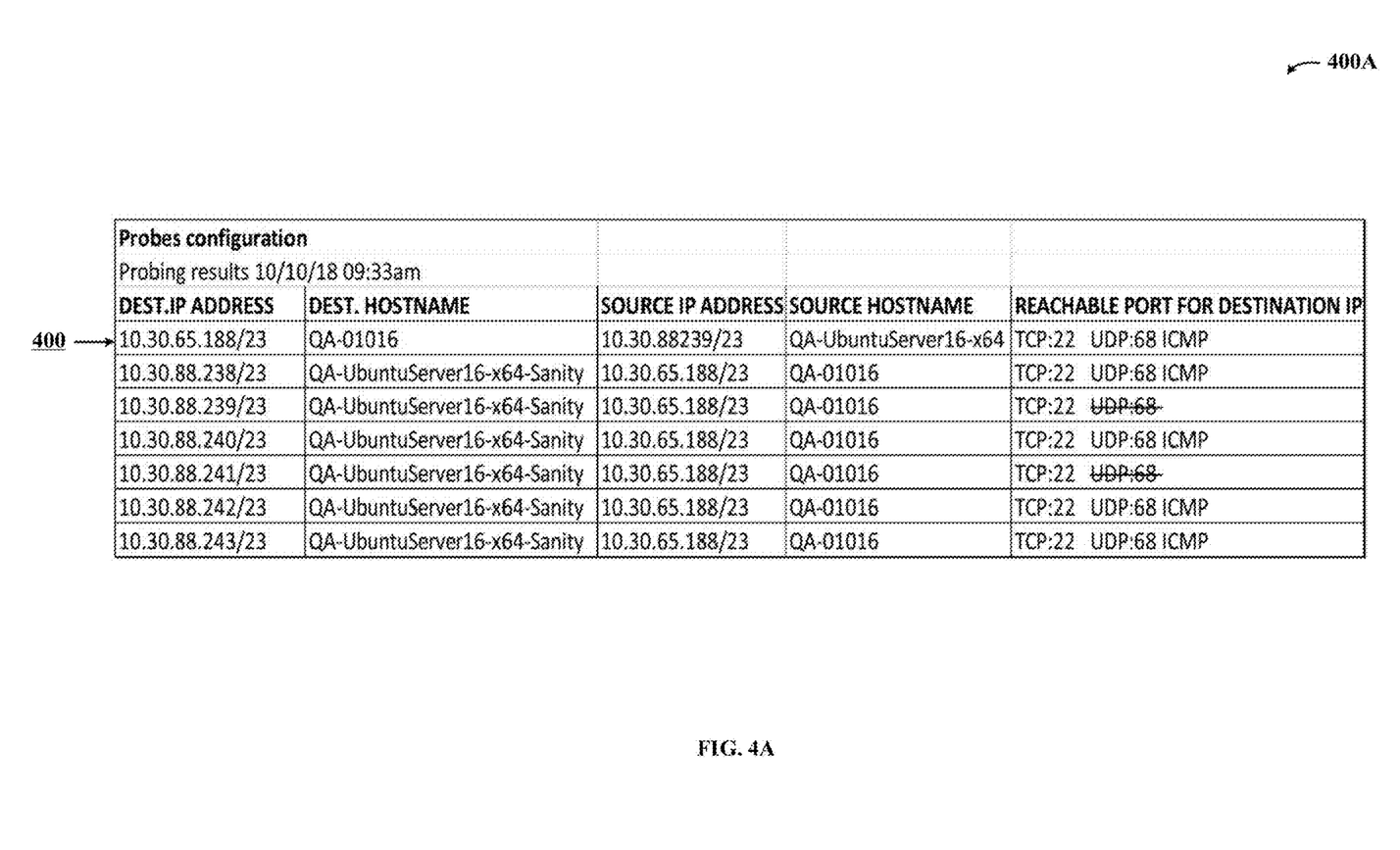
FIG. 4A illustrates a use case for illustrating a user interface showing probe configuration, according to one embodiment.

FIG. 4A illustrates a use case for illustrating user interface 400A showing the probe configuration, according to one embodiment. When the probing is initiated, a predetermined probe candidate sends a probe request packet to the individual destined resources and waits for a pre-determined time period before any response is received. After the probe results are received by the controller 310, the probe results are displayed in a user interface 400A. Probing of the resources is initiated in parallel, for example, the probe candidate may initiate sending the probe packets to the individual resources in parallel. For example, as shown in the user interface 400A, the probing results performed at date 10/10/18 and time 09:33 am is displayed. The row 402, shows the destination IP address '10.30.65.188/23', destination host name 'QA-01016', source IP address '10.30.88.239/23', source host name 'QA-UbuntuServer16-64', and the reachable port for destination IP is 'TCP:22 UDP:68 ICMP'. This implies that probing is performed from the source IP address to the destination IP address.

Figure 4B:
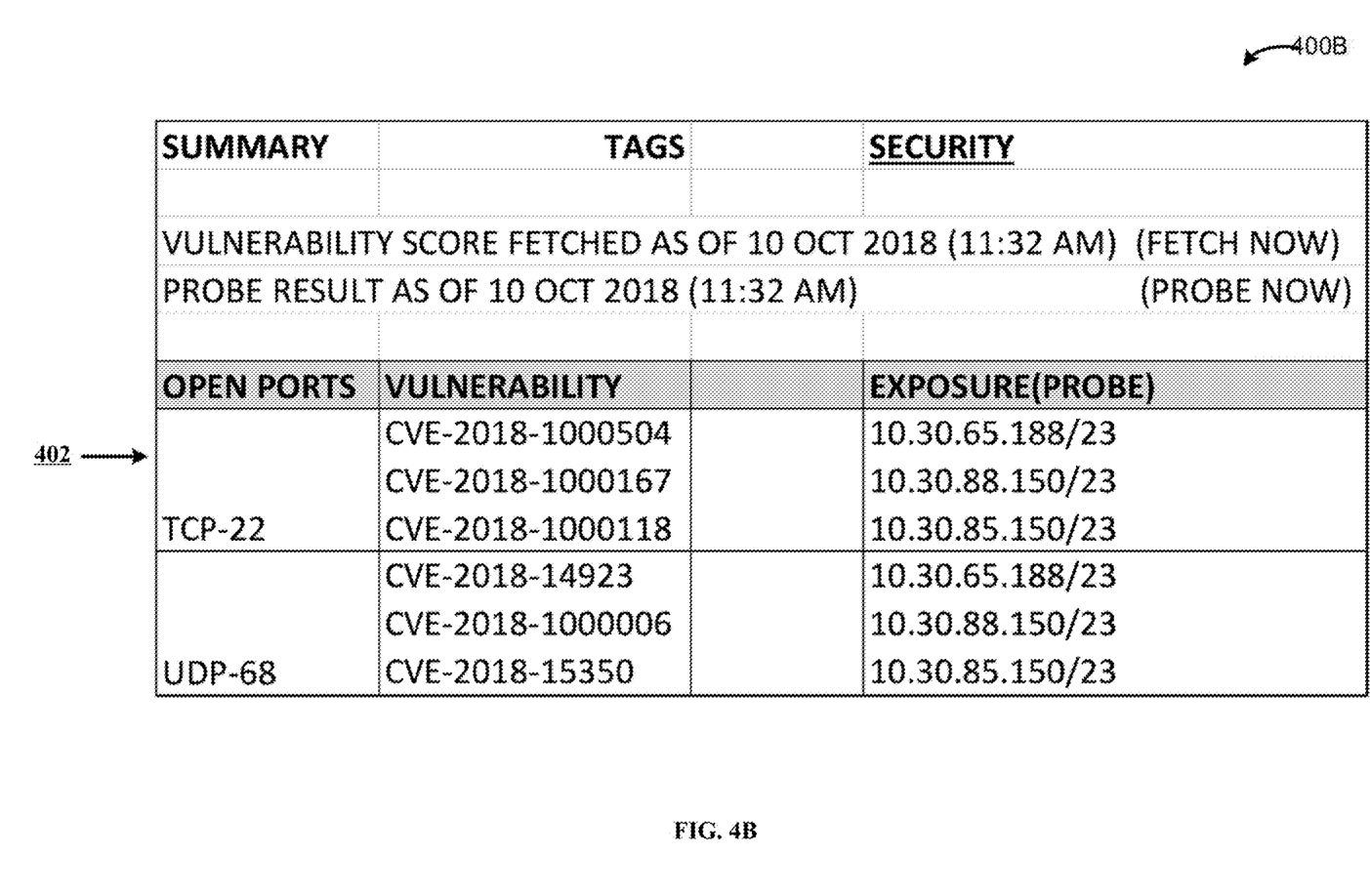
FIG. 4B illustrates a use case for illustrating user interface showing summary of vulnerability score and probe result, according to one embodiment.

FIG. 4B illustrates a use case for illustrating the user interface 400B showing summary of vulnerability score and probe result, according to one embodiment. The probe results as of date and time stamp '10 Oct. 2018 (11:32 AM)' is displayed. The row 404 shows open port such as TCP-22, vulnerabilities assessed at that port such as 'CVE-2018-1000504''CVE-2018-1000167', 'CVE-2018-1000118', and the exposure or probing is performed on the destination IP addresses '10.30.65.188/23', '0.30.88.150/23' and '10.30.85.150/23'. Based on probing these destination IP addresses at the open port TCP-22, the vulnerabilities listed above are identified. Based on the probe results, complimented with the vulnerability scans, controller 310 calculates the risk associated with the resource. Threshold is configurable by the user. For example, risk score above '6' can be configured as highly vulnerable. The risk score is calculated based on the probe value, CVSS value, enterprise defined resource attributes such as OS, role the resource is playing, impact type, connection types (secured and unsecured), etc.

Figure 5:
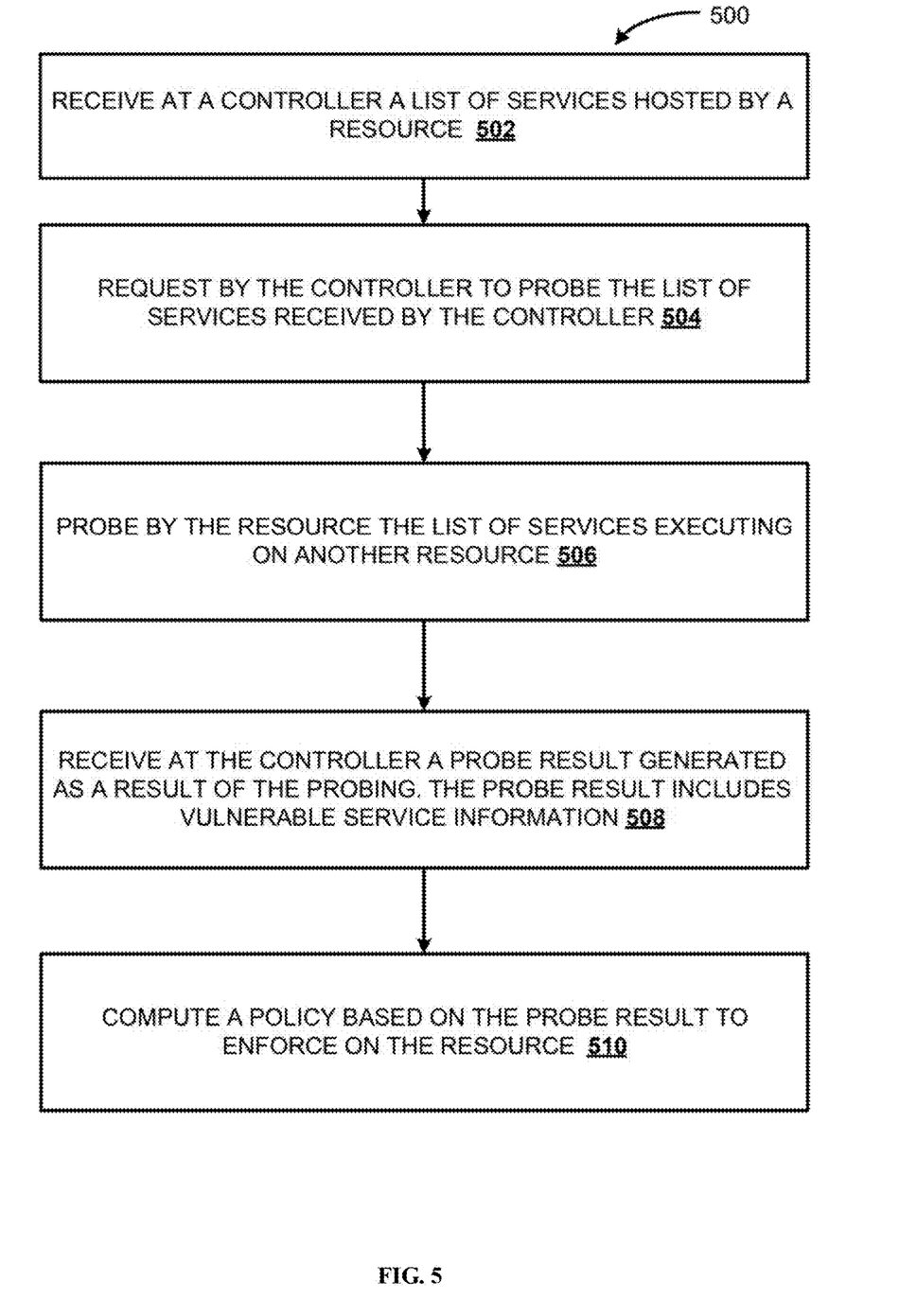
FIG. 5 is a flowchart illustrating a method for probing and securing the vulnerable network resources, using a centralized controller, according to one embodiment.

FIG. 5 is a flowchart 500 illustrating method for probe and secure the vulnerable network services using the centralized controller 310, according to one embodiment. At 502, a list of services hosted by a resource is received at the controller 310. A request, at 504, to probe the list of services is received by the controller 310. The probing is triggered by the controller 310, based on a user scheduled time. The probing includes sending a probe packet containing a special marker, from a predetermined probing resource. At 506, the list of services executing on another resource is probed by the probing resource. The probe candidate (i.e., the probing resource) is predetermined by the controller 310. The list of resources to be probed and corresponding sets of open ports and protocols is transmitted to the probe candidate. At 508, a probe result generated as a result of the probing is received at the controller 310. The probe result includes vulnerable service information. At 510, a policy is computed based on the probe result, and is enforced on the probed resources.

Some embodiments may include the above-described methods written as one or more software components. These components, and the functionality associated therewith may be used by clients, servers, distributed or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as 'instructions'. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
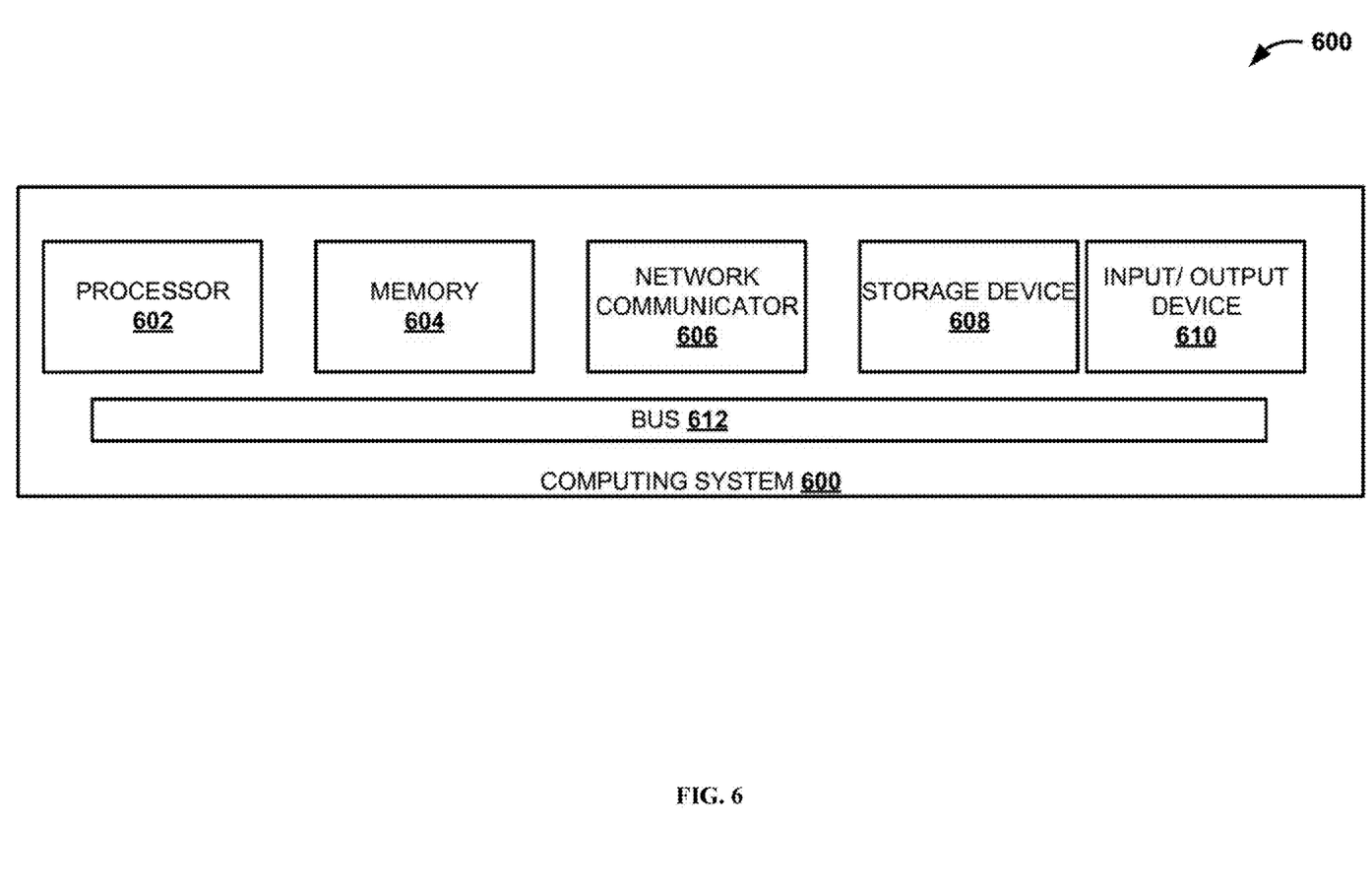
FIG. 6 is a block diagram of an exemplary computer system, according to one embodiment.

FIG. 6 is a block diagram illustrating a computing system 600 consistent with implementations of the system for probing and securing the vulnerable network resources, using a centralized controller. As shown in FIG. 6, the computing system 600 can include a processor 602, a memory 604, network communicator 606, a storage device 608, and input/output devices 610. The processor 602, the memory 604, network communicator 606, the storage device 608, and the input/output device 610 can be interconnected via a system bus 612. The processor 602 is capable of processing instructions for execution within the computing system 600. Such executed instructions can implement one or more components of, for example, application A. In some example embodiments, the processor 602 can be a single-threaded processor. Alternately, the processor 602 can be a multi-threaded processor. The processor 602 is capable of processing instructions stored in the memory 604 and/or on the storage device 608 to display graphical information for a user interface provided via the input/output device 610.

The memory 604 is a computer readable medium such as volatile or non-volatile that stores information within the computing system 600. The memory 604 can store instructions and/or other data associated with the processes disclosed herein. The storage device 608 is capable of providing persistent storage for the computing system 600. The storage device 608 can be a hard disk device, an optical disk device, or a tape device, or other suitable persistent storage means. The input/output device 610 provides input/output operations for the computing system 600. In some example embodiments, the input/output device 610 includes a keyboard and/or pointing device. In various implementations, the input/output device 610 includes a display unit for displaying graphical user interfaces.

According to some example embodiments, the input/output device 610 can provide input/output operations for a network device. For example, the input/output device 610 can include Ethernet ports or other networking ports to communicate with one or more wired and/or wireless networks (e.g., a local area network (LAN), a wide area network (WAN), the Internet).

In some example embodiments, the computing system 600 can be used to execute various interactive computer software applications that can be used for organization, analysis and/or storage of data in various formats. Alternatively, the computing system 600 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. Upon activation within the applications, the functionalities can be used to generate the user interface provided via the input/output device 610. The user interface can be generated and presented to a user by the computing system 600 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitory, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer-implemented method for configuring a centralized controller to probe network resources and services hosted thereon, and secure network resources deemed vulnerable, said computer-implemented method comprising the following computer-implemented steps:
    identifying, by a processor embedded within said controller, at least resources executed on a predetermined enterprise computer network, and services hosted on each of said resources;
    generating, by said processor, probe packets for probing each of identified resources;
    embedding, by said processor, a special marker into each of said probe packets, and thereby configuring said probe packets to be uniquely identified, and embedding, by said processor, said special marker into at least one of a reserved TCP options field of each of said probe packets, and a payload field of each of said probe packets, based on a type of each of said probe packets;
    transmitting, by said processor, said probe packets into each of said identified resources, and triggering, by said processor, said probe packets to execute a vulnerability scan on each of said identified resources, and generating, by said processor, a vulnerability scan report corresponding to each of said identified resources;
    calculating, by said processor, based at least in part on said vulnerability scan, a risk score corresponding to each of said identified resources, said risk score indicative of vulnerabilities associated with each of said identified resources; and
    dynamically configuring, by said processor, access policies applicable to each of said identified resources, based at least in part on said risk score, and apply each of said policies onto each of said identified resources respectively.

2. The method as claimed in claim 1, wherein the method further includes the step of triggering, by said processor, a software agent pre-installed in each of said identified resources, to identify at least one port open for said probe packets on each of said identified resources, and a communication protocol applicable to each of said identified resources for transmission of said probe packets thereto.

3. The method as claimed in claim 2, wherein the method further includes the step of selectively reconfiguring each of said probe packets, prior to transmission of said probe packets onto each of said identified resources, based at least on said communication protocol applicable to each of said identified resources and said at least one port open for said probe packets on each of said identified resources.

4. The method as claimed in claim 1, wherein the step of generating probe packets for probing each of identified resources, further includes the step of generating at least one of Transfer Control Protocol (TCP) packets, User Datagram Protocol (UDP) packets, and Internet Control Message Protocol (ICMP) packets.

5. The method as claimed in claim 1, wherein the method further includes the step of generating an error report, by said processor, in an event at least one of said probe packets fails to execute a vulnerability scan, after elapse of a predetermined threshold time from transmission of said probe packet.

6. The method as claimed in claim 1, wherein the step of embedding a special marker into each of said probe packets, further includes the step of embedding, by said processor, predetermined proprietary information as said special marker, in at least one of said reserved TCP options field of each of said probe packets, and said payload field of each of said probe packets, based on said type of each of said probe packets.

7. A computer-implemented centralized controller for probing network resources and services hosted thereon, and securing network resources determined to be vulnerable, said centralized controller comprising:
    a processor;
    a memory module communicably coupled to said processor, said memory module storing computer program code, wherein said memory module and computer program code stored therein are configured, with the processor, to:
        identify at least resources executed on a predetermined enterprise computer network, and services hosted on each of said resources;
        generate probe packets for probing each of identified resources;

embed a special marker into each of said probe packets, thereby configuring said probe packets to be uniquely identified, and embed said special marker into at least one of a reserved TCP options field of each of said probe packets, and a payload field of each of said probe packets, based on a type of each of said probe packets;

transmit said probe packets into each of said identified resources, and trigger said probe packets to execute a vulnerability scan on each of said identified resources, and generate a vulnerability scan report corresponding to each of said identified resources;

calculate, based at least in part on said vulnerability scan, a risk score corresponding to each of said identified resources, said risk score indicative of vulnerabilities associated with each of said identified resources; and dynamically configure access policies applicable to each of said identified resources, based at least in part on said risk score, and apply each of said policies onto each of said identified resources respectively.

8. The controller as claimed in 7, wherein said processor is configured to trigger a software agent pre-installed in each of said identified resources, to identify at least one port open for said probe packets on each of said identified resources, and a communication protocol applicable to each of said identified resources for transmission of said probe packets thereto.

9. The controller as claimed in claim 8, wherein said processor is further configured to selectively reconfigure each of said probe packets, prior to transmission of said probe packets onto each of said identified resources, based at least on said communication protocol applicable to each of said identified resources and said at least one port open for said probe packets on each of said identified resources.

10. The controller as claimed in claim 7, wherein said processor is further configured to generate an error report, in an event at least one of said probe packets fails to execute a vulnerability scan, after elapse of a predetermined threshold time from transmission of said probe packet.

11. The controller as claimed in claim 7, wherein each of said probe packets is selected from a group of packets consisting of Transfer Control Protocol (TCP) packet, User Datagram Protocol (UDP) packet, and Internet Control Message Protocol (ICMP) packet.

12. The controller as claimed in claim 7, wherein the processor is further configured to embed predetermined proprietary information as said special marker, in at least one of said reserved TCP options field of each of said probe packets, and said payload field of each of said probe packets, based on said type of each of said probe packets.

13. A non-transitory computer-readable storage medium having computer-executable instructions stored thereon, said computer-executable instructions, when executed by a processor, cause said processor to:

identify at least resources executed on a predetermined enterprise computer network, and services hosted on each of said resources;

generate probe packets for probing each of identified resources;

embed a special marker into each of said probe packets, thereby configuring said probe packets to be uniquely identified, and embed said special marker into at least one of a reserved TCP options field of each of said probe packets, and a payload field of each of said probe packets, based on a type of each of said probe packets;

transmit said probe packets into each of said identified resources, and trigger said probe packets to execute a vulnerability scan on each of said identified resources, and generate a vulnerability scan report corresponding to each of said identified resources;

calculate, based at least in part on said vulnerability scan, a risk score corresponding to each of said identified resources, said risk score indicative of vulnerabilities associated with each of said identified resources; and dynamically configure access policies applicable to each of said identified resources, based at least in part on said risk score, and apply each of said policies onto each of said identified resources respectively.

14. The computer-executable instructions as claimed in claim 13, wherein said computer-executable instructions, when executed by said processor, further cause said processor to:

trigger a software agent pre-installed in each of said identified resources, to identify at least one port open for said probe packets on each of said identified resources, and a communication protocol applicable to each of said identified resources for transmission of said probe packets thereto;

selectively generate and designate at least one of Transfer Control Protocol (TCP) packets, User Datagram Protocol (UDP) packets, and Internet Control Message Protocol (ICMP) packets, as said probe packets;

embed predetermined proprietary information as said special marker, in at least one of said reserved TCP options field of each of said probe packets, and said payload field of each of said probe packets, based on said type of each of said probe packets;

selectively reconfigure said probe packets, prior to transmission of said probe packets onto each of said identified resources, based at least on said communication protocol applicable to each of said identified resources and said at least one port open for said probe packets on each of said identified resources; and generate an error report in an event at least one of said probe packets fails to execute a vulnerability scan, after elapse of a predetermined threshold time from transmission of said probe packet.

\* \* \* \* \*